United States Patent [19]

Mulchi

[11] 4,141,703

[45] * Feb. 27, 1979

[54] AIR-POLLUTION FILTER AND FACE MASK

[75] Inventor: Charles L. Mulchi, New Carrolton, Md.

[73] Assignee: Stanley I. Wolf, Silver Spring, Md.; a part interest

[ * ] Notice: The portion of the term of this patent subsequent to Dec. 27, 1994, has been disclaimed.

[21] Appl. No.: 774,647

[22] Filed: Mar. 4, 1977

Related U.S. Application Data

[63] Continuation-in-part of Ser. No. 653,717, Jan. 30, 1976, Pat. No. 4,064,876.

[51] Int. Cl.[2] .................. B01D 50/00

[52] U.S. Cl. .................. 55/316; 55/487; 55/527; 55/DIG. 31; 55/528; 528/DIG. 33; 128/142.6

[58] Field of Search ............ 128/146.6, 141 R, 148 R, 128/142 R, 142.2, 142.3, 142.6, 145.8, 146 R, 146.2, 146.3, 146.4, 146.5, 146.7, 188, 191 R, 186, 212, 202; 55/316, 387, 485, 486, 487, 524, 527, 528, DIG. 33, DIG. 31

[56] References Cited

U.S. PATENT DOCUMENTS

| | | | |
|---|---|---|---|
| 1,789,262 | 1/1931 | Monro et al. | 55/417 |
| 1,931,989 | 10/1933 | Jenness | 23/288 F |
| 1,963,874 | 6/1934 | Stampe | 55/316 |
| 2,744,525 | 5/1956 | Whipple | 128/146 R |
| 2,787,333 | 4/1957 | Boone et al. | 55/316 |
| 2,822,059 | 2/1958 | Lunn et al. | 55/487 |
| 2,855,021 | 10/1958 | Hoppe | 154/41 |
| 2,898,908 | 8/1959 | Sovinsky | 128/141 R |
| 2,910,979 | 11/1959 | Shanty et al. | 128/141 R |
| 2,922,418 | 1/1960 | Heffernan et al. | 128/142.6 |
| 3,006,346 | 10/1961 | Golding | 131/10 |
| 3,118,445 | 1/1964 | Norman | 128/141 R |
| 3,142,549 | 7/1964 | Klusewitz et al. | 128/146.6 |
| 3,170,461 | 2/1965 | Watts, Jr. | 128/146.2 |
| 3,238,056 | 3/1966 | Pall et al. | 117/98 |
| 3,464,186 | 9/1969 | Hankison et al. | 55/316 |
| 3,538,020 | 11/1970 | Heskett et al. | 210/496 |
| 3,722,510 | 3/1973 | Parker | 128/142.6 |
| 3,732,669 | 5/1973 | Chambers | 55/321 |

OTHER PUBLICATIONS

Katz et al., The Universal and the Fireman's Gas Masks, 1923, pp. 4 & 5, Technical Paper No. 300, Dept.of Interior.

*Primary Examiner*—Henry J. Recla
*Attorney, Agent, or Firm*—Berman, Aisenberg & Platt

[57] ABSTRACT

A flexible polymeric mask, which covers the mouth and at least the lower part of the nose, has exhale-valve means and vertical supporting means for air-intake filter means. The filter means provides a wearer of the mask with air which has passed, in sequence, through, e.g., porous foam, activated charcoal, filter paper, absorbent cellulose and gauze.

12 Claims, 10 Drawing Figures

FIG. 4.
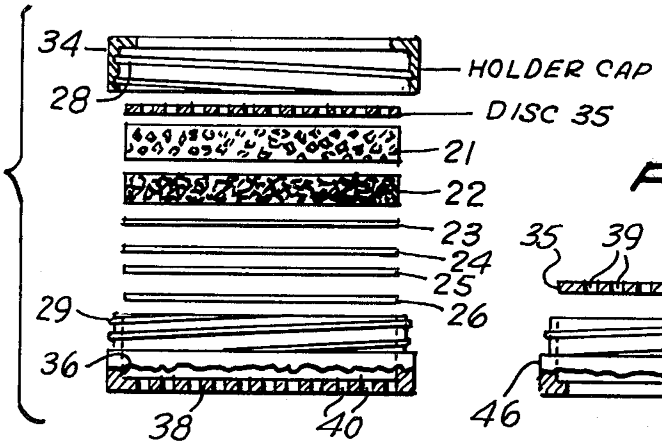
FIG. 5.
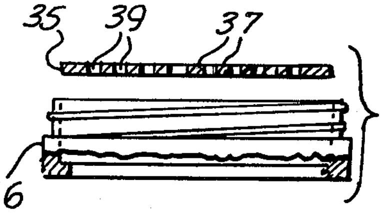
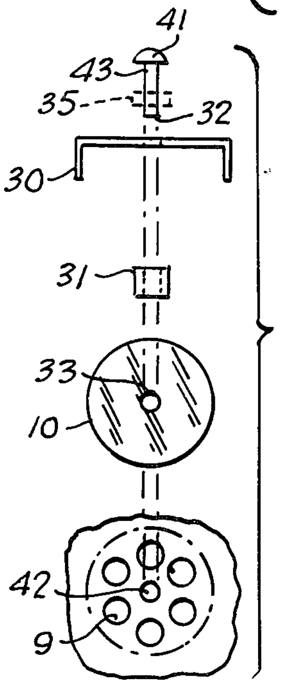
FIG. 6.
FIG. 7.
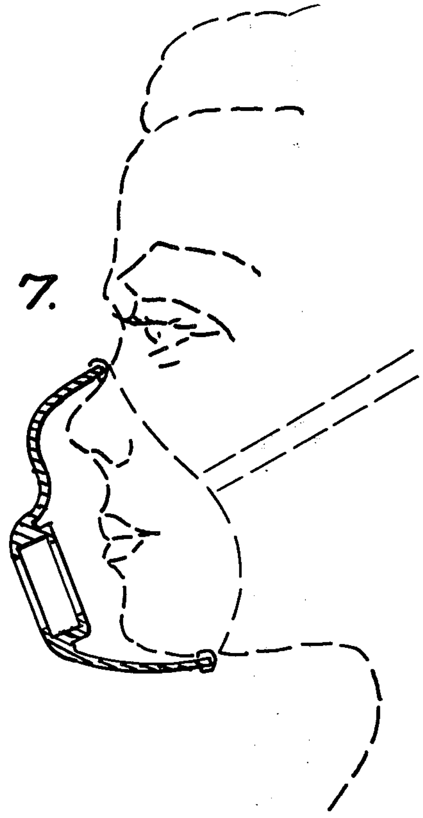
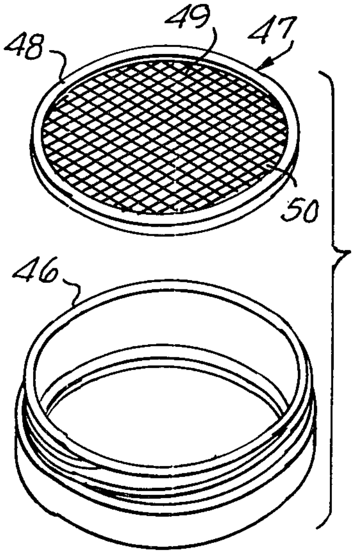
FIG. 8.

AIR-POLLUTION FILTER AND FACE MASK

RELATED APPLICATION

This application is a continuation-in-part of copending parent application Ser. No. 653,717, filed on Jan. 30, 1976, and now U.S. Pat. No. 4,064,876. The entire disclosure of this parent application is incorporated herein by reference.

BACKGROUND OF THE INVENTION

On Sept. 5, 1973, the front page of the Washington *Star News* carried an article: "Smog Boosts Illness Rate", directed to the effects of air pollution. Health effects of polluted air were also the concern of "Sewers in the Sky" [*Medical World News*, pages 49 to 56, Oct. 19, 1973]. A wide range of obnoxious substances found in the air have been associated with health problems, particularly during periods of high air pollution, high pollen count or dust in the air. There are also occupations, such as mining and painting; industries, such as textile and chemical; and leisure pursuits, such as woodworking, which present hazards to health through the poor quality of air that is inhaled during related activities.

Most mask units commonly available to persons suffering from respiratory irritations or allergies caused by air pollutants are effective only for the removal of particulate matter. In order to obtain relief from irritating aerosol mist or gaseous oxidants, mask units similar to those developed for military or police purposes have to be acquired. These military or police masks are designed for use in lethal gas situations, and are at best awkward and cumbersome for use in environments similar to that found in urban centers during periods of air stagnation.

SUMMARY OF THE INVENTION

A filter for a wide range of obnoxious air-borne substances, a canister or cartridge containing such filter and a face mask employing the canister and filter are separate aspects of the invention to which this application is directed. A further aspect provides for a face mask from which the canister is removable and thus replaceable or disposable. The filter is constituted so that synergism is observed both in the degree of filtering accomplished and in the duration of effective service.

An object of this invention is to provide a lightweight and non-cumbersome face mask which removes impurities from air which passes through a filter therein. A further object is to provide a comfortable mask which is esthetically acceptable and adaptable to widespread outdoor use. Another object is to fit the mask with a filter which is capable of removing gaseous, vapor, mist, particulate and dust impurities from air passing therethrough. A still further object is to provide the mask with a removable and disposable filter which has interchangeable counterparts for particular environmental conditions. Additional objects include having the filter in a separate canister or cartridge for ease of handling and having the filter designed so that it can be maintained in a vertical position for extended periods of time without detriment. Other objects are readily apparent from the following description.

BRIEF DESCRIPTION OF THE DRAWINGS

FIG. 4 is an explosion drawing (in cross-section) of an alternative cartridge construction showing the filter elements.

Filter 5 is a cross-section of a variation of the holder body of FIG. 4.

FIG. 6 is an explosion view of one form of exhale valve means.

FIG. 7 is a cross section of an alternatively-shaped mask.

FIG. 8 is a perspective view of the holder body of FIG. 5 with an alternative form of disc.

Figure 9:
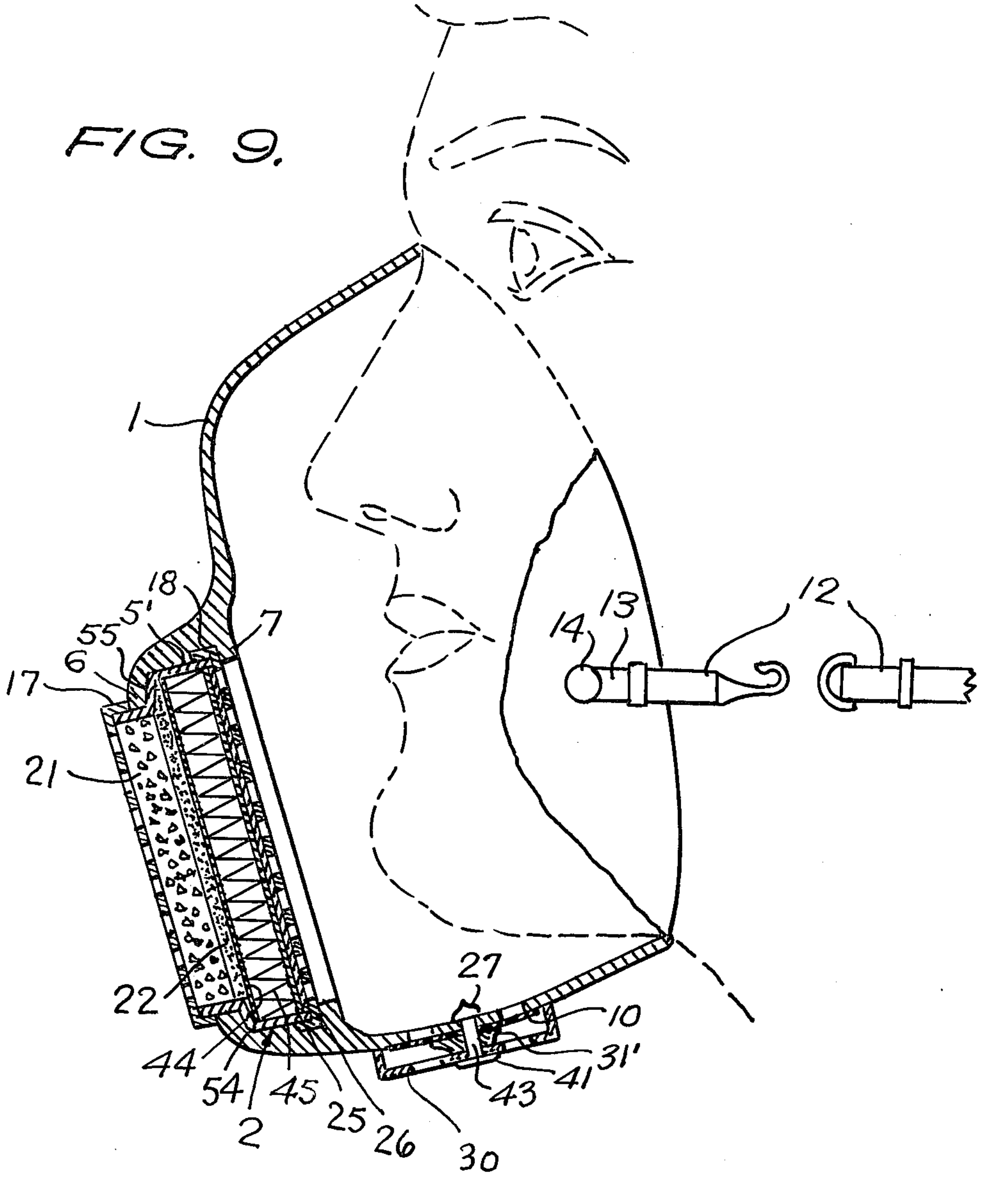

FIG. 9 is a cross section of an alternative embodiment of face mask and removeable canister.

Figure 10:
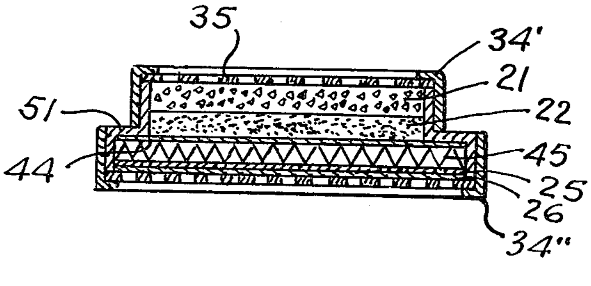

FIG. 10 is a cross section of an alternative canister structure for a mask of the type illustrated in FIG. 9.

UNIQUE FEATURES AND ADVANTAGES

1. A filter-containing mask is light in weight, is comfortable to wear, is cosmetically acceptable and more esthetically appealing than traditional military-type masks.

2. A filter unit for the mask combines materials (elements) in a manner such that a wide range of air-contaminating agents are reduced to levels safe for individuals who would otherwise experience respiratory irritation, discomfort and/or allergic reaction.

3. One of the filter elements is a compressed porous foam filter means which serves a triple purpose:
   a. it filters dust and other particulate materials from air passing through it;
   b. it removes certain gases from air passing through it when composed of polyester, e.g. polyester urethane; and
   c. it holds activated charcoal in place, eliminating the development of air channels between charcoal particles and making it practical to maintain the filter in a vertical position in normal use.

4. Although any activated charcoal is useful in the filter, highly-activated charcoal and preferably a selected blend of such highly-activated charcoal and charcoal impregnated with material specific to removal of certain contaminants from a gas stream coming in contact therewith provide a wider range of air-pollution filtration; properly-blended activated charcoals result in the greatest flexibility and more air-pollution filtration than a single grade of charcoal.

5. A prefilter element (downstream of the activated charcoal) also serves a triple function:
   a. it supports activated charcoal adjacent thereto and holds back fine charcoal particles;
   b. it serves as a high-capacity prefilter;
   c. it protects more delicate and more efficient downstream filter means from the activated charcoal and from particles that might otherwise reduce their capacity or longevity.

6. Absorbent cellulose and cellulose gauze (downstream of the prefilter):
   a. protect preceding filter elements (layers) from possible mechanical damage;
   b. trap moisture from exhaled air; and c. structurally support compressed filter components (elements).

In the alternative embodiments shown in FIGS. 9 and 10 the structural support feature is not present in the same manner as with the other embodiments.

7. The mask and filter assembly is versatile in application and construction:

a. the size of the mask can be adapted to both children and adults, using the same filters or filter cartridges;

b. specially-formulated filter cartridges are readily adapted for different types of application; in areas of high-sulfur dioxide concentration, the charcoal blend is adjusted for longer use under such conditions; highly-activated-charcoal enriched blends facilitate working in paint fumes, whereas impregnated charcoals specific to sulfur or nitrogen oxides offer more comfort to those in wood-working shops or other dusty environments; and c. air-flow characteristics are readily varied to adapt the filter and mask to a wearer's needs.

8. Critical features include the actual selection of filter components which are combined in the filter unit, the order in and the pressure to which components are subjected in use; an integral part of all of these features is the freedom (which they provide in combination) of air passage through the entire filter unit.

9. The components of the filter unit are arranged to provide increased service life.

10. The mask and filter unit are effective to overcome health problems associated with high air pollution and to alleviate the discomfort accompanying tasks during the performance of which a comtaminated atmosphere is encountered.

11. Air-flow resistance is materially decreased while substantially increasing the particulate-removal efficiency by removing particles in the 0.3 micron size range with a delicate pleated filter paper element.

12. Location of an air-exhaust valve below the chin portion of the mask facilitates removal of condensed moisture from the mask and improves cosmetic qualities of the unit.

DETAILS

The mask and filter unit remove from air a wide range of obnoxious substances which have been associated with health problems, particularly during periods of high air pollution, high pollen count or dust in the air. Also, the unit serves as a health aid in various occupational and leisure activities, such as mining, woodwork, chemical and textile industries, painting, etc., which involve dust or fumes. It is useful, e.g., while fumigating a house with pesticide or for entering a house which has been so fumigated. It is composed of materials which are not toxic to skin and substantially lowers the levels of a wide range of irritating substances whether they exist as solids, aerosol mists or gasses.

The unit is not a substitute for the military-type mask; it is useful in environments similar to that found in urban centers during periods of air stagnation. When properly worn by patients or persons subject to respiratory irritations, it allows them freedom to leave their homes for shopping or light work or physical exercise in their yards, etc., during periods of high air pollution. The filter unit provides an air flow rate which does not render a wearer uncomfortable while performing normal work activities and is effective for periods up to six weeks of regular use. Since the wearer ordinarily has no means for measuring continued effectiveness, the filter element should be replaced after, e.g., six weeks of regular use. Of course, there are certain activities, such as painting and working in extremely dusty environments, where more frequent filter changes are advisable.

The unit has been laboratory and patient tested for its effectiveness. The unit effectively removes 95% plus of oxidizing gasses, such as ozone and sulfur dioxide, at concentrations five times levels typically found in polluted urban air masses.

DESIGN & STRUCTURE

The filter mask 1 (illustrated in FIGS. 1, 7 and 9) is made from any of a wide range of materials which are moldable. The selected material is preferably flexible, i.e. has elastic qualities, so as to permit an appropriate seal about the face and to allow easy removal and snap-in of replacement filters 2. Ideally, the mask is colorless or flesh-tone to reduce negative esthetic effects to the wearer, thus making the mask more cosmetically acceptable.

RTV silicone products are examplary of those useful for the mask. Elongation properties of such products from 150 to 180 percent are satisfactory. The tensile strength (925 psi) for GE RTV-615 is superior to that (400 psi) of GE RTV-11. Other materials suitable for mask construction include natural and synthetic rubbers, Tygon, vinyl and similar plastic materials with sufficient flexibility and elasticity to permit easy exchange of the filter element or cartridge. The actual material from which the mask is constructed is not, per se, the essence of the invention to which this application is directed.

The mask has a portion 3 which is adapted to cover at least the lower part of the nose of the wearer and a receptable 4 for a filter cartridge 2. The receptable is an opening through the mask in the form of a channel 5 or 5' between an outer lip 6 and an inner lip 7, the lips circumscribing the channel so as to secure therebetween a filter cartridge and to permit the insertion and withdrawal of such filter cartridge from outside of the mask. The mask preferably has valve means 8 for permitting exhaled air to exit without permitting air from outside of the mask to enter. Such valve means comprises, e.g., a plurality of holes 9 covered by a thin plastic film 10 held in place by a button or other fastening means 11. The mask is held on the head of the wearer by any suitable means, such as an adjustable elastic band 12 which is appropriately secured at its ends to fasteners 13, pivotally connected by securing means 14 to the outer surface of the mask.

Figure 1:
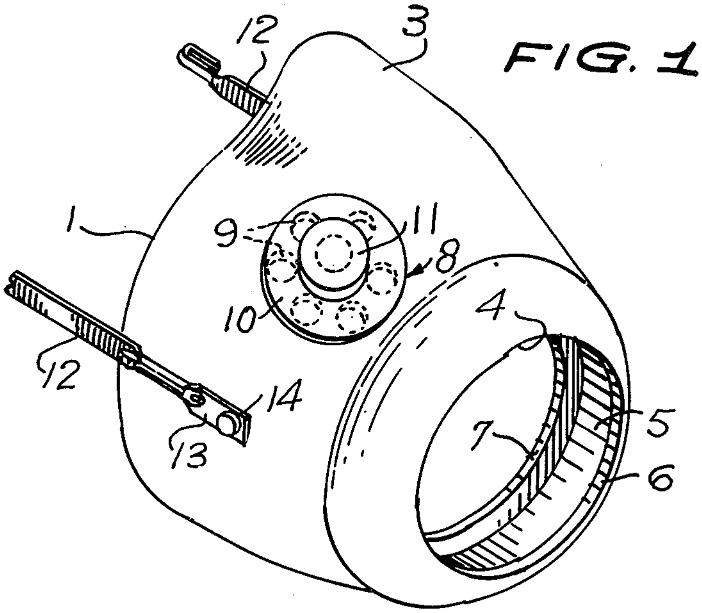
FIG. 1 is a perspective view of a face mask without a filter.
Figure 2:
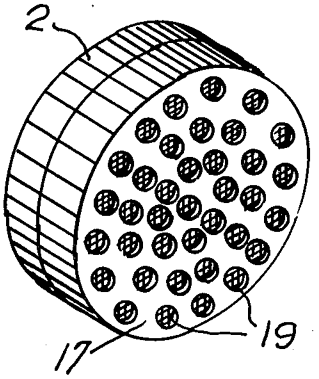
FIG. 2 is a perspective view of a filter containing canister adapted for use in the face mask.

The mask is preferably provided with two exhale-valve means. One such means is illustrated in FIG. 1; alternative structures are shown in FIGS. 6 and 9. These Figures provide for covering holes (each conveniently about one-eighth inch in diameter) 9 in mask 1 with a thin plastic film or diaphragm 10 which has a diameter of about 2.1 centimeters (cm). According to FIGS. 6 and 9 the diaphragm is protected by a protective cap 30, which may be of plastic or metal. This protective cap has a larger diameter than that of the diaphragm and physically guards the latter against inadvertent contact. A plastic pin 43, having a diameter of about one-eighth inch, a head 41 and an opposing end 32 passes through a hole in the center of the protective cap and then through a spacer 31 or 31', which separates the protective cap from the diaphragm, before passing through a hole 33 in the center of diaphragm 10 and then through hole 42 in mask 1. After such assembly of the respective parts, the end 32 of the plastic pin is softened by heat to form a flattened end 27 and thus secure the respective parts of the valve together and to the mask.

A single exhale valve is alternatively centrally located in the portion of the mask below the chin of the wearer. This not only improves the cosmetic qualities of the unit but also facilitates removal of condensed moisture from the inside of the mask.

The filter cartridge is of any of numerous materials, sizes and shapes, but is conveniently of a fairly rigid plastic material and in the form of a hollow right circular cylinder having perforated bases at opposite ends thereof. Alternative shapes are illustrated in FIGS. 9 and 10.

The filter holder (cartridge or canister) is optionally made from any of such diverse plastic materials as acrylic resins, e.g. polymethylmethacrylate; polyamide resins, e.g. nylon; polyethylene; polystyrene and vinyl resins. It is alternatively made from metals, such as aluminum. The key requirements are moldability, rigidity of final structure and chemical and physical resistance to moisture, dust, smog and mist.

The physical size of the holder orginarily ranges from 5 to 7 centimeters (cm), e.g. 55 millimeters (mm), in diameter (or provides a comparable surface if of a shape other than round) and from 12 to 16, e.g. 13, millimeters in total thickness. The materials used average 2 ± 0.2 millimeters in thickness, depending on their hardness.

The two halves or three pieces (embodiments of FIGS. 9 and 10) of the holder are joined by friction, cement, tape, threads, or any other available holding means.

The size and distribution of perforations in the filter holder are readily varied over a wide range but preferably average at least 50 percent of the surface area. Since the filter holder is moldable, these perforations are, e.g., rectangular (such as those of a screen mesh) or circular. For a 5 centimeter holder, a 50-percent open surface equals 9.8 $cm^2$ in area, which is accomplished by 77 perforations 4 millimeters in size, 50 perforations 5 millimeters in size or 35 perforations 6 millimeters in size. A larger unit would have a proportionately larger number of perforations. The perforations should be uniformly distributed over the area.

With a removable screen for one or each of the flat surfaces, it is possible to provide a cap with threads on the basic holder. This allows the contents to be compressed with the screen, and the cap secured while the contents are under compression.

The inside diameter of the unit should be kept within 4.6 to 6.6 centimeters with a thickness of 8 to 12 millimeters for embodiments of FIGS. 2 through 5 and of 18 to 22 millimeters for embodiments of FIGS. 9 and 10. Larger units are possible but not as pleasing to the onlooker. Smaller units sacrifice something in air flow and/or efficiency and the resulting comfort.

Figure 3:
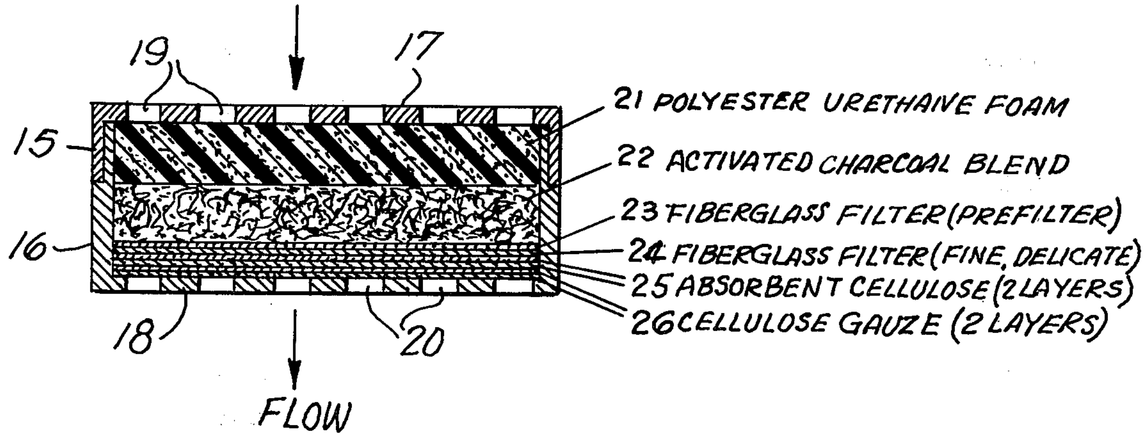
FIG. 3 is a cross-section of one embodiment of the filter-containing canister shown in FIG. 2.

The cartridge is readily prepared from two fitted sections 15 and 16 or from three fitted sections 18 (34"), 17 (34') and 51 (FIGS. 9 and 10) which are secured together (after assembly) by any suitable means, such as adhesive or a mechanical interlocking means. As shown in FIG. 3, section 15 is upstream and section 16 is downstream. In both base 17 through which air enters the filter cartridge and base 18 through which filtered air passes into the mask are perforations 19 and 20, respectively. Such perforations are conveniently in the form of circular holes about 5 mm in diameter and as close together as the strength of the cartridge base will permit. The holes are naturally over the entire extent of the entry base 17 so that the contained filter will be used as evenly as possible.

The cartridge structure is readily varied to a considerable extent without departing from the subject teachings. In this regard FIGS. 4, 5 and 8 to 10 provide alternative embodiments. FIG. 4 shows a hollow holder body 36 with a base 40 having perforations 38. This holder body has a threaded neck portion remote from the base and bearing external threads, e.g. about eight per inch, 29. The filter elements (21 through 26, inclusive) are sequentially piled on the inside of the base 40, followed by a perforated disc 35. By depressing the disc, thus compressing foam layer 21 so that the entire filter assembly fits within the holder body, holder cap 34, with grooves 28 (matching threads 29 of holder body 36), can be screwed and thus secured to the holder body.

Holder body 46 (FIGS. 5 and 8) can be substituted for holder body 36 without changing the assembly of the filter and cartridge. When holder body 46 is employed, a filter disc, such as perforated disc 35 (FIG. 5) or mesh disc 47 (FIG. 8), supports the filter elements within the cartridge and permits sufficient gas to flow therethrough. Mesh disc 47 comprises a frame 48 in which the respective ends of mesh 50 are secured, e.g., by crimping or melting (when the frame 48 is plastic). The sole requirement for the mesh disc (other than its strength) is that the spaces 49 must comprise at least as much area as the mesh 50.

The mesh disc 47 is completely interchangeable with the perforated disc 35 for either a holder cap 34, 34' or 34" or a holder body 46.

When a fine mesh is employed in a mesh disc in holder body 46 (for the cartridge), gauze layer 26 or its equivalent may be omitted.

The cartridge structure illustrated in FIGS. 9 and 10 differs in shape and in actual construction from those previously referred to. The prefilter is a structural unit which is bonded completely around its periphery to the internal ledge formed in the holder. Folded-filter-paper (pleated) filter element 45 is bonded along its periphery to the sidewalls of the portion of the cartridge in which it is contained to preclude having incoming air or contaminants bypass this element.

According to the embodiments of FIGS. 9 and 10 the only elements which are necessarily under compression are elements 21, 22 and, possibly, 44. Element 21 must be under compression in order to maintain element 22 in position when the cartridge (in use or otherwise) is in a vertical position.

The flexibility of the various possible combinations is noted by the fact that a cartridge, such as that illustrated in FIG. 10, is readily adapted to a mask, such as that illustrated in FIG. 7.

When a gas is passed through a filter, a pressure drop is necessarily created. The gas flow and pressure drop are directly proportional. The size of the unit also affects the gas flow. For a 5-centimeter diameter cartridge unit, a flow rate of, e.g., 50, or even as high as 70, liters per minute and a pressure drop of 4 ± 2 centimeters of water are encountered for this invention. The higher flow rates correspond to the higher pressure drops, etc. As is appreciated, the minimum flow rate is not critical. For larger diameter cartridge units, correspondingly higher flow rates are obtained. Also, these parameters vary with the particular materials in the filter.

The embodiments illustrated in FIGS. 9 and 10 employ a folded or pleated filter element. The use of such an element necessitates an appropriate alteration in the configuration of the holder or cartridge. To protect the pleated filter element from the charcoal particles (held in place under compression), the prefilter is provided in the form of a structural element which is secured to the holder to support the charcoal under pressure exerted upon it by the porous compressible means to filter contaminated gas, such as polyurethane foam.

To prevent bypassing the pleated filter, it is bonded along its entire periphery to the sidewalls of the cartridge. Similarly, one or more other filter elements downstream of the pleated filter are preferably, but need not necessarily be, secured to the cartridge sidewalls along their entire respective peripheries to preclude bypassing them.

By using a pleated filter for the fine-filter element, the filtering surface is effectively incrased from about 18 $cm^2$ to about 150 $cm^2$. As the fine-filter element is the component which offers materially more resistance than any other element to passage through the filter cartridge, the increased surface substantially reduces air-flow resistance and also permits the use of more efficient grades of filter paper, e.g. Hollingsworth & Vose H90 or H95. Use of the latter grades of filter paper increases particulate-removal efficiency from 60 percent to 90+ percent for 0.3 micron particles.

The essential components of the preferred filter in the order in which they are contacted by air entering the filter from outside of the mask are: a filter foam 21, such as polyester urethane foam; activated charcoal 22, preferably in the form of a blend; a prefilter 23 (this element is not actually essential to the invention and is dispensible, particularly when the preceding two components are combined) or 44; a fine delicate filter 24 or 45; absorbent cellulose 25, preferably two layers; and cellulose gauze 26, preferably two layers, but dispensible under conditions previously mentioned. Elements can be repeated or divided; for example, the filter foam can be divided so that part is before and part is after the activated charcoal. Other elements can be added, but the noted components and the indicated sequence are significant factors in the obtained results.

In preparing the filled cartridge, the filter components are best fitted into cartridge element 16 in reverse order, starting with the cellulose gauze and ending with the filter foam, which is then compacted by pressing cartridge section 15 thereover. The compaction of the foam secures particulate activated charcoal so that the filter unit may be employed for extended periods in a vertical position i.e. a position wherein the respective bases are essentially perpendicular to the horizontal, with virtually no shift in the relative position of the activated charcoal particles.

For the embodiments of FIGS. 9 and 10, prefilter 44 must be secured in place first. Thereafter, it is preferred to insert and appropriately bond elements 45, 25 and 26 in that order before closing the downstream portion of the cartridge and then proceeding with the filling of the upstream portion sequentially with, e.g., activated charcoal and polyester urethane foam before closing the upstream portion of the cartridge.

After the filter components are in place and the respective bases 17 (34') and 18 (34") are secured, the cartridge is ready for introduction into channel 5 of the receptacle in mask 1. The bases are secured in place on the filled cartridge by press fitting, heat sealing, glueing, screwing (when respective elements are provided with matching threads, as illustrated, e.g., in FIG. 4) or any other appropriate manner.

SPECIFIC EMBODIMENTS

A filter unit (FIG. 3) consists of a clear plastic perforated holder or cartridge 2 which separates into two interlocking parts 15 and 16. The size of the holder (5 cm or 2 inches in diameter) is subject to variation within reasonable limits. This is also true with regard to the size (5 mm or 3/16 inch in diameter) of holes in the unit. For example, adult sizes may be larger. During manufacturing, the two interlocking parts are, e.g., cemented together to eliminate accidental separation during handling.

The first (outer) filter component consists of a layer of polyester urethane foam (Scott Filter Foam). In prototype testing, a thickness of 12 mm (0.5 inch) performs satisfactorily. The texture of the foam may be varied, but a texture of 100 pores per linear inch is recommended for removal of large dust, pollen grains and particulate matter from an air stream passing therethrough. Grades of foam with as few as 45 pores per linear inch are also useful for this component, but removal of smaller particulate material is sacrificed. The polyester urethane foam is highly porous and thus offers little resistance to air flow. The polyester urethane foam reacts with certain gasses, such as ozone, with oxidant properties. Having the urethane foam upstream of the activated charcoal thus has a tendency to prolong the activated-charcoal effectiveness somewhat. However, the primary function of the polyester urethane layer is removal from an airstream of dust, particulate matter, pollen and aerosol mist droplets. The polyester urethane layer is compressed to a thickness of approximately 5 mm with a force of approximately 20 ± 3 $gm/cm^2$. The compaction serves a vital purpose of holding the activated charcoal layer in place.

Other foam materials made from similar or related plastic materials are alternatively used provided that they conform to the uniform properties, i.e. filter grade, demonstrated by the Scott product. The range in foam thickness is 1 ± 0.5 cm prior to compaction.

Since the outer layer serves primarily as a rough filter to remove dust, pollen grains, etc., other filter materials, such as cotton or cellulose pads and glass fiber pads, which perform in a similar manner (providing they are filter grade materials with uniform air flow properties and uniform porosity) are substitutable for the filter foam. These materials provide the necessary compression resistance to hold the activated charcoal in place, especially when the proper thickness is utilized. Alternatively, a coarse glass fiber pad with activated charcoal granules suspended within the fibers is used as the first filter component. This effectively combines the first two filter components into a single component and reduces or eliminates the need for the third filter component, the prefilter.

The second component in the filter is a layer of activated charcoal. The general effectiveness of activated charcoal for removing a broad spectrum of compounds from air is well known. Irritating gasses, such as oxidants, e.g. ozone, are effectively removed. The charcoal in the filter is any commercial-grade activated charcoal, such as Barnebey-Cheney PC 9942, but is preferably a blend of activated charcoals. In prototype testing, a 50-50 mixture of activated charcoal impregnated with substances specific for sulfur and nitrogen oxides (Barnebey-Cheney-CH 2286) was combined with highly-activated charcoal (Barnebey-Cheney-PE 9395). This combination proved highly effective for oxidant and sulfur oxide removal. Also in prototype testing, charcoal granules sieved through a 12 × 30 mesh screen provided necessary surface area for effective filtration. Since the size of charcoal granules controls the absorptive surface area and hence the activity of the charcoal, the effectiveness of the filter is somewhat regulated by varying the size of the granules.

The granule sizes may vary from material which passes through a U.S. Sieve Series (ASTM E11) No. 7 (2.80 mm) down to No. 30 (0.60 mm). Larger granules may not provide the necessary surface area for the level of sustained activity for a six- to eight-week service life. Smaller granules tend to compact, thus blocking the air flow through the filter. It is preferred that the granules be uniform and average those which pass through U.S. Sieve Series No. 18 (1.0 mm).

Granules smaller than No. 30 (0.6 mm) are, alternatively, suspended in the preceding filter pad, thus combining elements 1 and 2 into a single element. Such an arrangement provides a highly effective element due to the large surface area of the charcoal. With this combined-element arrangement, however, dust loading of the filter pad tends to block the filter and make it difficult to obtain adequate air flow after several weeks in use.

The amount of charcoal needed for a given filter depends on the size of the holder and size of the charcoal granules. In prototype testing (for the 5 centimeter holder) 5 grams of 50-50 blend of B.C. (Barnebey-Cheney) PE 9395 and B.C. CH 2286 which passes through U.S. Sieve Series No. 18 (1.0 mm) yield up to six weeks of effective oxidant removal.

When smaller granule sizes are used, less material is necessary due to the increase in charcoal activity resulting from the increased surface area. A suitable suggested range (for a 5 cm holder) includes from 3 grams of 0.6 mm material to 6 grams of 2.8 mm material. Larger-sized holders need proportionately larger quantities — e.g. 1.5 × for holders 6 cm to 2.0 × for holders 7 cm in diameter (factors based on surface areas for the respective holders compared to that of the 5 cm unit).

The charcoal granules are held in place by the compressed polyester urethane layer, thus eliminating any development of air channels through which pollutants may escape removal.

The structural element which immediately follows the charcoal layer is an optional prefilter. Its primary purpose is to protect the more delicate filter, which it precedes, from either being crushed by the charcoal or being plugged by charcoal dust or other large particulates which may have escaped removal by the foam. Its removal would permit a drop in flow resistance; however, the risk of damage to the delicate filter layer is increased. When the foam and charcoal layers are replaced by a charcoal-impregnated pad, the structural element is not as necessary and may be omitted.

In prototype testing a very low-resistant filter paper (Hollingsworth & Vose — H-60 FG) composed of glass fibers and organic binder was very satisfactory due to its high loading volume and low resistance to air flow. This element is replaceable by a wide range of commercially-available glass fiber materials which have uniform porosity, which have low air flow resistance and which provide the necessary structural protection to the more delicate element which it precedes.

The thickness of this third filter element is not as critical as the filtration performance and air flow properties. When present, a preferred thickness is 0.6 ± 0.3 mm.

The filter layer serves as a pre-filter to the more efficient layer which follows. It serves to trap dust, etc., which passes through the foam and charcoal layers and dust from the charcoal. One of its key purposes is to protect the more delicate and efficient following layer from being crushed by compressed charcoal granules.

The fourth filter component has the primary function of removing the smaller particulate matter. The quality of this element determines the maximum efficiency of the overall unit for particulate removal. It also determines the overall flow properties and air resistance for the unit.

Depending on the desired level of overall efficiency of removal of smaller-sized particulate fractions, there are at least two grades of materials which are useful for the fourth filter component. Hollingsworth and Vose Co. produces H-75 FG and H-90 papers, which are both suitable components. The H-75 FG has been rated at 60% efficiency for particulate matter 0.3 micron in size. The H-90F is less efficient than the H-75 FG for particulate matter 0.3 micron in size, but has a much lower resistance to air flow. With H-75 FG, the pressure drop across the filter at 33 liters/minute flow rate is 3.5 cm of water, whereas, with H-90F, the pressure drop at a similar flow rate is 3.2 cm of water. The H-75 FG is composed of glass fibers, and the H-90 F is composed of glass fibers and cellulose fibers. Both filters yield a satisfactory level of filtration for most general usages. As previously noted, H90 or H95 folded filter paper is far more efficient and is useful in the embodiments illustrated by FIGS. 9 and 10. With a pleated or folded filter, as shown in FIG. 9 and FIG. 10, air-flow resistance is at least reduced to half that of filters of the design illustrated in FIG. 3 and FIG. 4 for a flow rate of 50 liters per minute. Thus, for a circular section of about 5 centimeters in diameter, a gas stream passed through the pleated-filter embodiments at a flow rate of 50 ± 20 liters per minute with a pressure drop of 3 ± 1, or even 2 ± 1, centimeters of water when using the same filter medium that results in a pressure drop of 4 ± 2 centimeters of water at the same flow rate with the design illustrated in FIG. 3 and FIG. 4.

In prototype testing of the embodiments of FIGS. 3 and 4 the H-60FG was satisfactorily used as a prefilter in conjunction with each of H-75FG and H-90F. However, there are cases where a lower flow resistance than that provided by either of the more efficient materials is desired. Two layers of H-60 FG provide a minimum level of suitable filtration for the unit.

These elements are replaceable by any commercially-available materials with superior or equivalent filtration and/or flow properties. Their thickness is not as critical as their filtration performance. A suitable thickness is 0.6 ± 0.3 mm.

The fifth component in the filter is composed of (preferably two layers of) absorbent cellulose. The fifth layer serves the dual purpose of protecting the glass fiber layers preceding it from possible mechanical damage from inside the mask plus serving as a moisture vapor trap. The preferred dual layers offer filtration to trap possible loose glass fibers which may enter the air stream. Their primary functions are to protect the preceding layers and to trap moisture in exhaled air.

The absorbent material has an open texture which promotes low air resistance.

In prototype testing, several types of materials performed satisfactorily. Most were open-textured paper type materials not rated for their filtration properties. However, there are woven cellulose fabric materials commercially available which serve as suitable substitutes. A thin layer of surgical cotton is an ideal substitute. A thickness of 1.5 ± 0.5 mm is adequate.

The sixth and final component in the filter is composed of (preferably two layers of) cellulose. The cellulose serves to protect the preceding layers and to offer structural support for the compressed components (in those embodiments wherein adjacent components are compressed), especially over the air holes in the holder. A cellulose gauze layer aids in trapping moisture in exhaled air and in releasing moisture vapor into inhaled air.

There are many substitute materials available, including gauze made from various synthetic products. When the filter holder is of the mesh type with uniform grids of 1 to 2 mm square perforations, this element may be omitted altogether, since the internal components are adequately protected.

Compressing filter foam from 12 mm to 5 mm requires a pressure of 20 ± 3 gm/cm$^2$. The charcoal, however, does not need a force of this magnitude to prevent shifting. A force of 4 ± 1 gm/cm$^2$ is sufficient. It is important for the charcoal to remain in place. The minimum force for such purpose is all that is required.

The entire filter is compressed into an overall thickness of from approximately 8 to approximately 12 mm within the holder.

The described filter unit provides air flow rates of, e.g., 50 ± 20 liters per minute (per circular section of about 5 cm in diameter) at a pressure drop of 4.0 ± 2.0, preferably at most 4.0, cm of water for filters of the design illustrated in FIG. 3 and FIG. 4 and at a pressure drop of 3 ± 1, preferably 2 ± 1, cm of water for filters of the design illustrated in FIG. 9 and FIG. 10. The air flow and pressure characteristics are satisfactory for normal usage and should not prove uncomfortable to most wearers while performing normal work activities. The flow rate and pressure drop may be varied by substituting materials with different porosity ratings and/or increasing the effective diameter of the filter surface. To increase the flow rate or decrease the pressure drop appreciably, more-porous components are necessary. However, such substitutions have a tendency to reduce the effectiveness of the filter for removal of smaller-sized particulate fractions, but should not appreciably affect effectiveness for removing noxious gasses.

The filter provides two-way synergism — synergism in service life and synergism in the amount of contaminants actually removed from a gas stream passing therethrough. By the arrangement of filter elements, dust-loading of the charcoal is minimized, thus increasing its effective service life and its effective capacity during service.

A mask having improved characteristics is illustrated in FIG. 9, which shows a unit with improvements in both the mask design and the filter and cartridge construction. Although there is a slight modification in the shape of channel 5 (element 5' in FIG. 9) to accommodate the altered shape of the cartridge, such modification is not a critical part of the invention. The cartridge unit illustrated in FIG. 10 is the full equivalent of that shown in FIG. 9 and would not necessitate any alteration in the shape of channel 5.

The location of the air-exhaust valve in the lower part of the mask, as shown in FIG. 9, has a functional advantage in addition to the improved cosmetic effect. Such placement facilitates eliminating condensed moisture from inside the mask.

The exhaust valve represented in FIG. 9 is similar to that shown in FIG. 6 except for the shape of the spacer 31 (31').

The filter and cartridge illustrated in FIG. 9 correspond to and parallel their counterparts in FIGS. 2 through 6 and 8. The fine delicate filter 24, however, is in the form of a pleated or folded filter 45, and this change in the form of the delicate filter makes it necessary to effect several other modifications. As the form of element 45 is such that it will not support the compression exerted by element 21, it must be shielded or protected therefrom. This is accomplished by providing a structurally-effective prefilter 44 (in lieu of prefilter 23) bonded to the internal ledge 51 of the cartridge along the entire periphery of the prefilter. The physical strength of the prefilter and of the bonding is sufficient to withstand the compression imposed upon the activated charcoal 22 (to maintain it in position when the mask is moved and/or the cartridge is held in a vertical position) by the foam 21. This means that the only two elements actually under any significant compression in this modification are the filter foam 21 and the activated charcoal 22.

The folded or pleated delicate filter 45 is bonded to the sidewalls of the cartridge along the entire periphery of the filter element to preclude any bypass of the filter. Similarly, filter elements downstream of element 45 are preferably bonded along their entire respective peripheries to the sidewalls of the cartridge for the same purpose.

The thus-modified cartridge has an external shoulder 54 and is internally divided into two compartments, one in which the filter elements are supported by the compression exerted by one of the elements on the other and the other in which each of the filter elements is preferably secured in place by its relevant position and by being adhered to the cartridge sidewalls.

Holder caps 34' and 34" (FIG. 10) correspond to holder cap 34 (FIG. 4) and are optionally similarly provided with threads so that they may be screwed in place (on a correspondingly-threaded member — not shown). To minimize the physical variations in the sidewall dimensions of the cartridge, the sidewalls of cap 34' extend to ledge 55 (FIG. 9), as do the sidewalls of cap 34".

With reference to the filter cartridges illustrated in FIGS. 9 and 10, their cross-sections (like that shown in FIG. 2) are preferably circular. The overall external height is about 2 centimeters (1 cm for each of the two internal compartments). The external diameter of holder cap 34' or base 17 is preferably about 5 cm, whereas that of holder cap 34" or base 18 is preferably about 6 cm. Such a unit wherein the filter foam 21 is polyester urethane filter foam having from 90 to 100 pores per inch and the folded filter 45 is pleated filter paper which is from 60 to 90 percent efficient in the filtering of particles 0.3 micron in size is preferred.

In the embodiments shown in FIGS. 9 and 10, the activated charcoal is optionally intermeshed in the foam filter or otherwise disposed in a manner indicated to be acceptable in other embodiments. Also, folded filter 45 is optionally treated to absorb or trap moisture. Such treatment is well known and is not a critical part of this invention. When filter 45 is so treated, however, the requirement for element 25 is not so critical and the latter may be eliminated. Even with such treatment of filter 45, retention of element 25 is preferred.

The invention and its advantages are readily understood from the foregoing description. It is apparent that various changes may be made without departing from the spirit and scope of the invention or sacrificing its material advantages. The forms hereinbefore described and illustrated in the drawings are merely those of preferred embodiments.

What is claimed is:

1. A filter which has a plurality of component elements which, in combination, provide means capable of passing a gas stream therethrough at a flow rate which, per circular section of about 5 centimeters in diameter, is in the range of from 50 ± 20 liters per minute at a pressure drop of at most about 4.0 centimeters of water, the elements comprising, in sequence:

i. porous compressible means to filter contaminated gas and particulate activated charcoal means;
ii. low-resistant prefilter means to retain particles and to protect subsequent elements;
iii. low-resistant filter means for filtering particulate matter as small as 0.3 micron in diameter and moisture-trapping absorbent means; and
iv. means to protect preceding elements;

the particulate activated charcoal means being no further upstream than the porous compressible means; the moisture-trapping absorbent means being no further upstream than the low-resistant filter means; the porous compressible means providing means for removal of large dust particles, pollen grains, other particulate matter and aerosol droplets from the gas stream; the particulate activated carbon means providing means for removal of irritating gases from the gas stream; each element being immediately juxtaposed to adjacent elements; and the porous compressible means exerting sufficient positive pressure to maintain the particulate activated charcoal means in position.

2. A filter according to claim 1 wherein the low-resistant filter means for filtering particulate matter as small as 0.3 micron in diameter is folded or pleated filter paper.

3. A filter according to claim 2 wherein moisture-trapping absorbent means is integral with the low-resistant filter means for filtering particulate matter as small as 0.3 micron in diameter.

4. A filter according to claim 2 wherein moisture-trapping absorbent means are provided by at least one element which is separate, distinct and immediately downstream from the low-resistant filter means for filtering particulate matter as small as 0.3 micron in diameter.

5. A filter according to claim 2 wherein the activated charcoal means is immediately downstream from the porous compressible means.

6. A filter according to claim 2 which comprises the following elements in sequence:

a. porous foam filter means for removal of large dust particles, pollen grains, other particulate matter and aerosol droplets from the gas stream and having from 70 to 110 pores per linear inch,
b. particulate activated charcoal means for removal of irritating gases from the gas stream,
c. low-resistant prefilter means to supplement physical filtration provided by (a) and (b), to retain dust and other particles in the activated charcoal means and to protect subsequent elements against being crushed by granules in the particulate activated charcoal means,
d. folded or pleated filter paper for filtering particulate matter as small as 0.3 micron in diameter,
e. absorbent means to trap moisture, and
f. gauze means to protect preceding elements.

7. A filter according to claim 6 wherein the porous foam filter is a polyester urethane foam filter which has from 90 to 100 pores per linear inch.

8. A cartridge filter having a circular cross-section and a hollow casing with two opposed essentially-flat perforated surfaces through which gas can pass, one of the flat surfaces being an inlet or upstream surface and the other being an outlet or downstream surface, the hollow casing being filled with filter elements in a fixed sequence between the inlet and outlet surfaces so that each filter element is in immediate juxtaposition to each adjacent filter element and that gas passing from the inlet surface through the cartridge to the outlet surface must pass sequentially through each filter element; the filter elements constituting the filter according to claim 2 wherein the low-resistant prefilter means and the folded or pleated filter paper are bonded to the casing along their entire respective peripheries.

9. A cartridge filter according to claim 8 wherein the hollow casing is internally divided into two sections by the prefilter means which structurally support sufficient compression imparted by the porous compressible means to maintain the activated charcoal means in position and which are secured to an internal ledge or shoulder which forms part of the casing.

10. A cartridge filter according to claim 9 wherein the diameter of the inlet surface is less than that of the outlet surface.

11. A moldable polymeric face mask which is adapted to cover a wearer's mouth and nostrils and which has a cartridge filter and gas-outlet valve means, the cartridge filter being a cartridge filter according to claim 8.

12. A face mask according to claim 11 wherein the gas-outlet valve means is in the lower portion of the mask at a position adapted to be under the wearer's chin.

* * * * *